United States Patent
McAteer et al.

(10) Patent No.: US 12,189,668 B2
(45) Date of Patent: *Jan. 7, 2025

(54) QUERY EXPANSION USING A GRAPH OF QUESTION AND ANSWER VOCABULARY

(71) Applicant: International Business Machines Corporation, Armonk, NY (US)

(72) Inventors: Seamus R. McAteer, Navan (IE);
Ahmed M. M. R. Salem, Dublin (IE);
Daniel J. McCloskey, Dublin (IE);
Mikhail Sogrin, Kildalkey (IE)

(73) Assignee: International Business Machines Corporation, Armonk, NY (US)

( * ) Notice: Subject to any disclaimer, the term of this patent is extended or adjusted under 35 U.S.C. 154(b) by 231 days.

This patent is subject to a terminal disclaimer.

(21) Appl. No.: 17/659,867

(22) Filed: Apr. 20, 2022

(65) Prior Publication Data
US 2022/0245180 A1 Aug. 4, 2022

Related U.S. Application Data

(63) Continuation of application No. 16/878,596, filed on May 19, 2020, now Pat. No. 11,321,371, which is a
(Continued)

(51) Int. Cl.
*G06F 16/33* (2019.01)
*G06F 16/332* (2019.01)
*G10L 15/06* (2013.01)

(52) U.S. Cl.
CPC ...... *G06F 16/3338* (2019.01); *G06F 16/3329* (2019.01); *G06F 16/3334* (2019.01); *G10L 15/063* (2013.01)

(58) Field of Classification Search
None
See application file for complete search history.

(56) References Cited

U.S. PATENT DOCUMENTS

| 6,272,507 B1 | 8/2001 | Pirolli |
| 7,249,124 B2 | 7/2007 | Sasaki |

(Continued)

FOREIGN PATENT DOCUMENTS

| CN | 105659225 A | 6/2016 |
| CN | 107832319 A | 3/2018 |

(Continued)

OTHER PUBLICATIONS

Lopez, Vanessa, Enrico Motta, Victoria Uren, and Marta Sabou. "State of the art on semantic question answering." (2007). (Year: 2007).*

(Continued)

*Primary Examiner* — Richard L Bowen
(74) *Attorney, Agent, or Firm* — Jared C. Chaney

(57) ABSTRACT

A method and/or system for query expansion may include: providing a set of training data in a given domain in the form of training question texts and training answer texts, identifying disjoint answer words in the training answer text that do not occur in the associated training question text, generating a graph of question word nodes and answer word nodes generated from the set of training data for the given domain in the form of the training question texts and the training answer texts, wherein edges are provided between a disjoint pair of a question word node for a question word in a training question and an answer word node for a disjoint answer word in an associated training answer, and applying spreading activation through the graph to result in a top n most highly activated nodes that are used as candidate words for expansion of a user query input.

25 Claims, 10 Drawing Sheets

Related U.S. Application Data continuation of application No. 16/022,898, filed on Jun. 29, 2018, now Pat. No. 10,678,822.

(56) References Cited

U.S. PATENT DOCUMENTS

| | | | |
|---|---|---|---|
| 7,287,025 | B2 | 10/2007 | Wen |
| 9,117,194 | B2 * | 8/2015 | Liu ................. G06F 16/35 |
| 10,678,822 | B2 | 6/2020 | Mcateer |
| 2005/0210009 | A1 | 9/2005 | Tran |
| 2006/0020593 | A1 | 1/2006 | Ramsaier |
| 2009/0070311 | A1 | 3/2009 | Feng |
| 2011/0320187 | A1 | 12/2011 | Motik |
| 2012/0226687 | A1 | 9/2012 | Xu |
| 2015/0269139 | A1 | 9/2015 | Mcateer |
| 2016/0147872 | A1 | 5/2016 | Agarwalla |
| 2016/0188566 | A1 * | 6/2016 | Jifroodian-Haghighi ................. G09B 5/02 704/10 |
| 2017/0024460 | A1 | 1/2017 | Mac An Tsaoir |
| 2017/0109426 | A1 * | 4/2017 | Arora ............ G06F 16/24578 |
| 2018/0143760 | A1 * | 5/2018 | Orr .............. G06F 3/04886 |
| 2018/0144465 | A1 * | 5/2018 | Hsieh .............. G16H 30/40 |
| 2018/0150607 | A1 | 5/2018 | Macleod |
| 2018/0246953 | A1 | 8/2018 | Oh |
| 2019/0252074 | A1 | 8/2019 | Datla |
| 2019/0370389 | A1 * | 12/2019 | Blouw ............. G06N 3/049 |
| 2020/0004875 | A1 | 1/2020 | Mcateer |
| 2020/0034722 | A1 | 1/2020 | Oh |
| 2020/0278990 | A1 | 9/2020 | Mcateer |

FOREIGN PATENT DOCUMENTS

| | | |
|---|---|---|
| EP | 2104044 A1 | 9/2009 |
| JP | 2003256466 A | 9/2003 |
| JP | 2011248596 A | 12/2011 |
| JP | 2013033452 A | 2/2013 |
| WO | 2015047963 A1 | 4/2015 |

OTHER PUBLICATIONS

Reshadat, Vahideh, and Mohammad-Reza Feizi-Derakhshi. "Neural network-based methods in information retrieval." Am. J. Sci. Res 58 (2012): 33-43. (Year: 2012).*

Japanese Refusal dated Nov. 29, 2022, for Japanese Patent Application No. 2020-563471.

Tomonori Yoshida, et al, Automated Extraction of Related Term Networks from FAQ Site, IEICE Technical Report, vol. 108, No. 119, The Institute of Electronics, Information and Communication Engineers, Jun. 23, 2008, , pp. 75~80.

Balaneshinkordan, et al., "An Empirical Comparison of Term Association and Knowledge Graphs for Query Expansion", ECIR, 2016, pp. 1-6.

Balaneshin-Kordan, et al., "Sequential Query Expansion using Concept Graph", Proceedings of the 25th ACM International on Conference on Information and Knowledge Management, Oct. 24-28, 2016, pp. 155-164.

Colace, et al., "Weighted Word Pairs for query expansion", Information Processing & Management, vol. 51, Issue 1, Jan. 2015, pp. 179-193.

Fonseca, et al., "Concept-Based Interactive Query Expansion", Proceedings of the 14th ACM international conference on Information and knowledge management, Oct. 31-Nov. 5, 2005, pp. 696-703.

International Search Report and Written Opinion dated Oct. 12, 2019, for International Application No. PCT/IB2019/055380, filed Jun. 26, 2019.

Jiang, Xue, "Query Expansion Based on a Semantic Graph Model", Proceedings of the 34th international ACM SIGIR conference on Research and development in Information Retrieval, Jul. 24-28, 2011, p. 1315.

Li, et al., "Natural Language Supported Relation Matching for Question Answering with Knowledge Graphs", Proceedings of the FirstWorkshop on Knowledge Graphs and Semantics for Text Retrieval and Analysis, Aug. 11, 2017, pp. 43-48.

List of IBM Patents or Patent Applications Treated as Related, Apr. 19, 2022, 2 pages.

Mell et al., "The NIST Definition of Cloud Computing", National Institute of Standards and Technology, Special Publication 800-145, Sep. 2011, 7 pages.

* cited by examiner

QUERY EXPANSION USING A GRAPH OF QUESTION AND ANSWER VOCABULARY

BACKGROUND

The present disclosure relates to query expansion in information retrieval, and more specifically, to query expansion using a graph of question and answer vocabulary.

Information retrieval is the activity of obtaining information resources relevant to information need from a collection of information resources. Searches can be based on full-text or other content-based indexing, including semantic labeling or other metadata not found directly in the text.

An information retrieval process begins when a user enters a query into the system. Queries are formal statements of information needs, for example, search strings in search engines. In information retrieval, a query does not uniquely identify a single object in the collection. Instead, several objects may match the query with different degrees of relevancy.

Query expansion is essential in information retrieval systems. A user should not be expected to know the exact content of documents they hope to retrieve via search. By augmenting a query with additional related terms, the likelihood that a relevant document is retrieved will be increased.

Query expansion is the process of reformulating a given query to improve retrieval performance in information retrieval operations, particularly in the context of query understanding. In search engines, query expansion involves evaluating a user's input (what words were typed into the search query area, and sometimes other types of data) and expanding the search query to match additional documents.

Known query expansion involves techniques such as: finding synonyms of words and including these in the search query, finding different morphological forms of the words in the search query, correcting spelling errors, etc. Additional metadata such as related topics of interest or semantic labeling can be used to improve the likelihood that relevant documents are returned, even when a direct lexical or word match is not possible. For example, if words describing cats and dogs are all labeled with the tag "Animal", and a user query contains such vocabulary and is tagged similarly, it may help to filter the set of search results in system output to those that are tagged as containing an "Animal" reference, rather than depending on a direct reference of the specific word in the question.

Predicting the content of a document that a user's query should point to is far from trivial. Simply adding additional terms to the query may exacerbate the retrieval problem.

In some situations, a user's query text does not match that of the expected answer. This is particularly exacerbated in domain or task specific searches, such as legal, financial, or biomedical question answering, or in any domain where there is a rich domain specific vocabulary that does not overlap readily with common vocabulary that a typical user may try to search with.

SUMMARY

According to an aspect of the present disclosure there is provided a computer-implemented method for query expansion using a graph of question and answer vocabulary. The method can include providing a set of training data in a given domain in the form of training question texts and training answer texts, identifying disjoint answer words in the training answer text that do not occur in the associated training question text, generating a graph of question word nodes and answer word nodes generated from the set of training data for the given domain in the form of the training question texts and the training answer texts, wherein edges are provided between a disjoint pair of a question word node for a question word in a training question and an answer word node for a disjoint answer word in an associated training answer, and providing a graph of question word nodes and answer word nodes generated from a set of training data for a given domain in the form of training question texts and training answer texts, wherein the answer word nodes are of disjoint words that do not occur in both a training question text and an associated training answer text, and edges are provided between a disjoint pair of a question word node for a question word in a training question and an answer word node for a disjoint answer word in an associated training answer. The method can further include applying spreading activation through the graph to result in activated nodes that are output as candidate words for expansion of a user query input.

This method may provide the advantage that using disjoint answer word nodes in the graph with edges to question word nodes provides disjoint pairs of question-answer words that give a linkage between a set of terms from questions representing a domain task and terms in search content without relying on sematic relationships between the nodes.

Applying spreading activation may propagate a signal in all directions across question word nodes and answer word nodes that are directly or indirectly connected to activated input nodes.

The method may capture user feedback on results of the user query input into a search engine using the candidate words for expansion and may use the user feedback to update the graph. This provides a graph update mechanism that is easy to implement by augmenting the nodes, edges, and weightings of the graph.

The user query input may be a question input and activation of input nodes may activate question word nodes. In some embodiments, a user query input includes an answer input in addition to the question input and activating input nodes activates answer word nodes in addition to question word nodes. Where a user query input includes an answer input in addition to a question input, this may provide query expansion by refining search results to a style of answer and the candidate words may be used for refinement of the search results to an answer style.

Activating the graph may be improved using various methods. Activation of input nodes in the graph may activate nodes with overlapping surface forms and lemma forms of the words in the user query input. Activation of input nodes in the graph may apply edge relationship definitions for edges between question word and answer word pairs with different weightings for each relationship definition of an edge. Activation of input nodes may apply sub-topic relationship definitions for edges between question word and answer word pairs with different weightings for each relationship definition of an edge.

Generating the graph of question word nodes and answer word nodes may include adding nodes to the graph as question word nodes and answer word nodes, wherein the answer word nodes are for the identified disjoint words in the set of training data. Generating the graph can further include adding edges between a disjoint pair of a question word in a training question and a disjoint answer word in an associated training answer.

According to another aspect of the present disclosure there is provided a computer-implemented method for query expansion using a graph of question and answer vocabulary. The method can include providing a set of training data in a given domain in the form of training question texts and training answer texts, identifying disjoint answer words in a training answer text that do not occur in an associated training question text, adding nodes to a graph as question word nodes and answer word nodes, wherein the answer word nodes are for the identified disjoint answer words in the set of training data. The computer-implemented method can further include adding edges between a disjoint pair of a question word in a training question and a disjoint answer word in an associated training answer, applying spreading activation through the graph to result in activated nodes, and outputting the activated nodes as candidate words for expansion of a user query input.

This aspect generates a graph of disjoint question and answer vocabulary that may be used in the described activation method.

In some embodiments, the graph may be configured for improvement. This may include only creating edges between question word and answer word pairs with the question words and answer words having lexical or semantic relationships. This may also provide relationship definitions for edges between question word and answer word pairs and may provide different weightings for each relationship definition of an edge.

Adding nodes to a graph as question word nodes may include conditionally selecting words from the training question texts according to predefined constraints. The predefined constraints may include one or more of a requirement that the word has a pre-specified part-of-speech, a frequency of the term in a corpus, whether or not a word is a stop word for the domain, whether the word appears in a domain vocabulary or ontology, and whether the word is a question word.

The training question texts may be authored by real intended users and training answer texts may be texts from a corpus of documents from which answers are retrieved.

According to another aspect of the present disclosure there is provided a system for query expansion using a graph of question and answer vocabulary. The system can include a processor and a memory configured to provide computer program instructions to the processor to execute the function of the components, the components including a graph generating component for providing a set of training data in a given domain in the form of training question texts and training answer texts, identifying disjoint answer words in the training answer text that do not occur in the associated training question text, and generating a graph of question word nodes and answer word nodes generated from the set of training data for the given domain in the form of the training question texts and the training answer texts, wherein edges are provided between a disjoint pair of a question word node for a question word in a training question and an answer word node for a disjoint answer word in an associated training answer. The components can further include a graph applying component including a query receiving component for receiving a user query input, a graph input component for activating input nodes in the graph for at least some words in the user query input, a graph activation component for applying spreading activation through the graph, and a graph output component for returning a result of activated nodes that are output as candidate words for expansion of the user query input. The system may also include a user feedback component for capturing user feedback on results of a user query input into a search engine using the candidate words for expansion and using the user feedback to update the graph.

The user query input may be a question input and/or an answer input, and the graph input component may activate question word nodes and/or answer word nodes. Where a user query input includes an answer input in addition to the question input, this may refine search results to a style of answer, and wherein the graph output component may return a result of a top n most highly activated nodes that are used as candidate words for refinement of the search results to an answer style.

According to another aspect of the present disclosure there is provided a system for query expansion using a graph of question and answer vocabulary. The system can include a processor and a memory configured to provide computer program instructions to the processor to execute the function of the components. The components can include a graph generating component including a training data component for providing a set of training data in a given domain in the form of training question texts and training answer texts, a disjoint word component for identifying disjoint answer words in a training answer text that do not occur in both an associated training question text, a node adding component for adding nodes to a graph as question word nodes and answer word nodes, wherein the answer word nodes are for the identified disjoint answer words in the set of training data. The components can further include an edge adding component for adding edges between a disjoint pair of a question word in a training question and a disjoint answer word in an associated training answer, a graph activation component for applying spreading activation through the graph to result in activated nodes, and a graph output component for outputting the activated nodes as candidate words for expansion of a user query input.

The system may further include a weighting component which may include a node weighting component for providing weightings for the nodes configured to weight the nodes by the frequency of occurrence of the question word of a question word node in the set of training data and the frequency of occurrence of the answer word of an answer word node in the set of training data, and an edge weighting component for providing weightings of edges between nodes configured to weight an edge according to the frequency of the disjoint question word and answer word pair across the set of training data.

The system may include a semantic restricting component for providing the graph that only creates edges between question word and answer word pairs with the question words and answer words having lexical or semantic relationships.

The system may include an edge relationship component for providing relationship definitions for edges between question word and answer word pairs and providing different weightings for each relationship definition of an edge.

The system may include a feedback receiving component for receiving user feedback on results of a user query input into a search engine using the candidate words for expansion and a graph updating component for applying the user feedback to the graph.

According to another aspect of the present disclosure there is provided a computer program product for query expansion using a graph of question and answer vocabulary, the computer program product including a computer readable storage medium having program instructions embodied therewith. The program instructions executable by a processor can cause the processor to provide a set of training data in a given domain in the form of training question texts and training answer texts, identify disjoint answer words in the training answer text that do not occur in the associated training question text, and generate a graph of question word nodes and answer word nodes generated from the set of training data for the given domain in the form of the training question texts and the training answer texts, wherein edges are provided between a disjoint pair of a question word node for a question word in a training question and an answer word node for a disjoint answer word in an associated training answer. The program instructions can be further configured to apply spreading activation through the graph to result in activated nodes that are used as candidate words for expansion of a user query input.

According to another aspect of the present disclosure there is provided a computer program product for query expansion using a graph of question and answer vocabulary, the computer program product including a computer readable storage medium having program instructions embodied therewith. The program instructions executable by a processor to can cause the processor to provide a set of training data in a given domain in the form of training question texts and training answer texts, identify disjoint answer words in a training answer text that do not occur in an associated training question text, add nodes to a graph as question word nodes and answer word nodes, wherein the answer word nodes are for the identified disjoint answer words in the set of training data. The program instructions can be further configured to cause the processor to add edges between a disjoint pair of a question word in a training question and a disjoint answer word in an associated training answer, apply spreading activation through the graph to result in activated nodes, and output the activated nodes as candidate words for expansion of a user query input.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of typical embodiments and do not limit the disclosure.

Some embodiments of the present invention will now be described, by way of example only, with reference to the following drawings in which.

It will be appreciated that for simplicity and clarity of illustration, elements shown in the figures have not necessarily been drawn to scale. For example, the dimensions of some of the elements may be exaggerated relative to other elements for clarity.

DETAILED DESCRIPTION

The described method and system provide query expansion by building a graph of disjoint question-answer word pairs from a ground truth in the form of a set of training data and activating the graph with unseen query vocabulary at runtime. Using the described method and system directly wires into answer content that has no immediately apparent lexical or semantic link with the question text.

Figure 1:
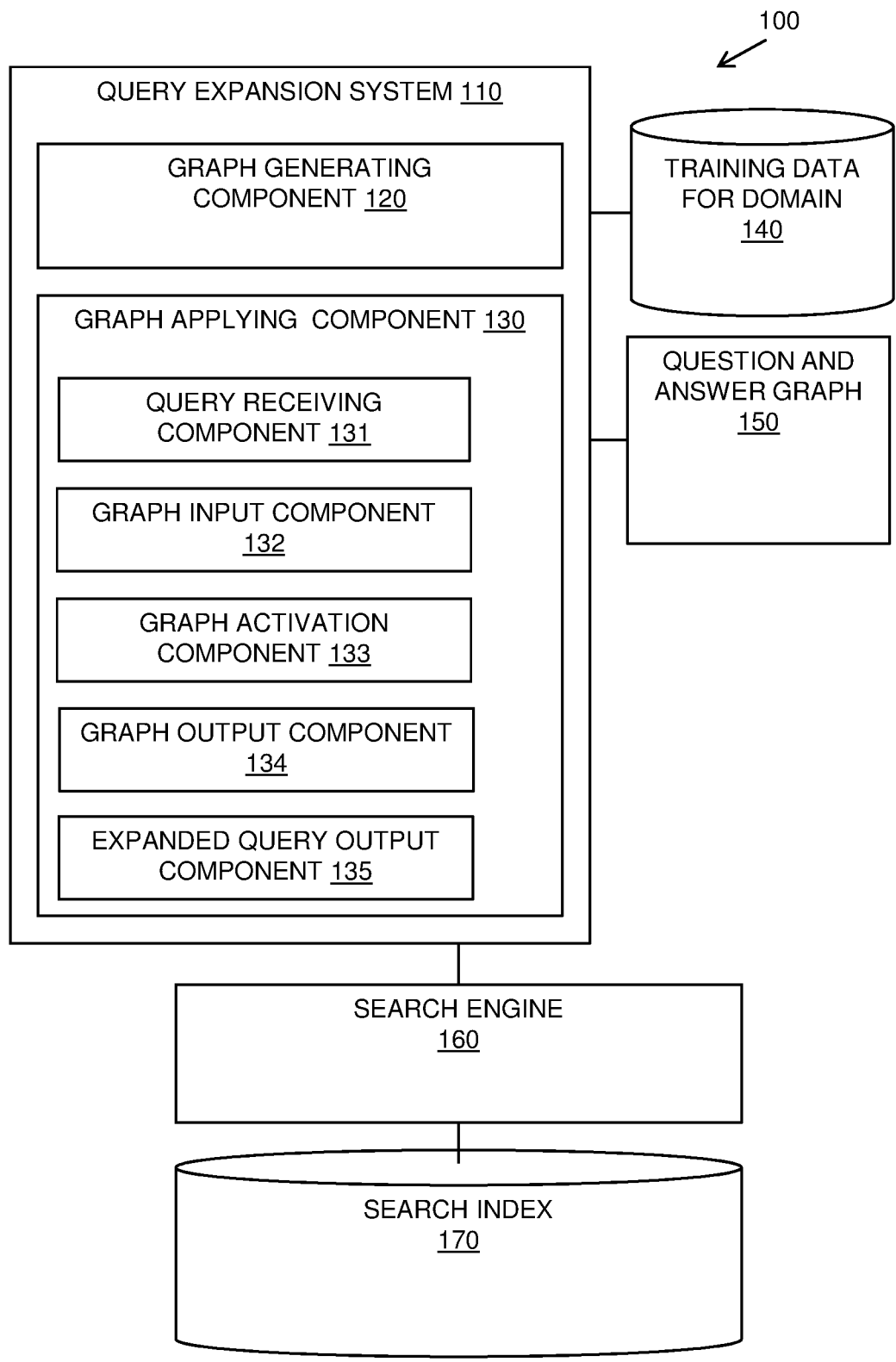
FIG. 1 is a block diagram of an example embodiment of a system in which aspects of the present invention are implemented.

Referring to FIG. 1, a block diagram shows an example embodiment of an information retrieval system 100 in which the described method and system may be implemented including a search engine 160 for searching a search index 170 of documents and a query expansion system 110 for expanding a user query for use in the search engine 160 for retrieving documents from the search index 170.

The described query expansion system 110 includes a graph generating component 120 for generating a question and answer graph 150 from a set of training data 140 for a domain. The training data 140 is a ground truth of information provided by direct input, in this case in the form of training questions with training answers in a specific domain.

The question and answer graph 150 is a data structure providing a graph of disjoint question and answer vocabulary that has question word nodes and answer word nodes that have connecting edges and node and edge weightings generated from the training data 140 as described further below.

The query expansion system 110 includes a graph applying component 130 for applying the question and answer graph 150 during a user query in a search engine 160 in order to expand the query terms.

The graph applying component 130 includes a query receiving component 131 for receiving a user's unseen query input, a graph input component 132 for inputting at least some of the words from the query input into the question and answer graph 150. The graph applying component 130 includes a graph activation component 133 for activating the graph with the activated nodes of the query input and a graph output component 134 for outputting a top n words from the graph activation.

The graph applying component 130 includes an expanded query output component 135 for outputting the expanded query to the search engine 160 for improving the search of the search index 170.

The illustrated information retrieval system 100 can improve the quality of relevance for documents retrieved through a search query. By augmenting the query with additional related terms, it can increase the likelihood that relevant documents are retrieved.

Figure 2A:
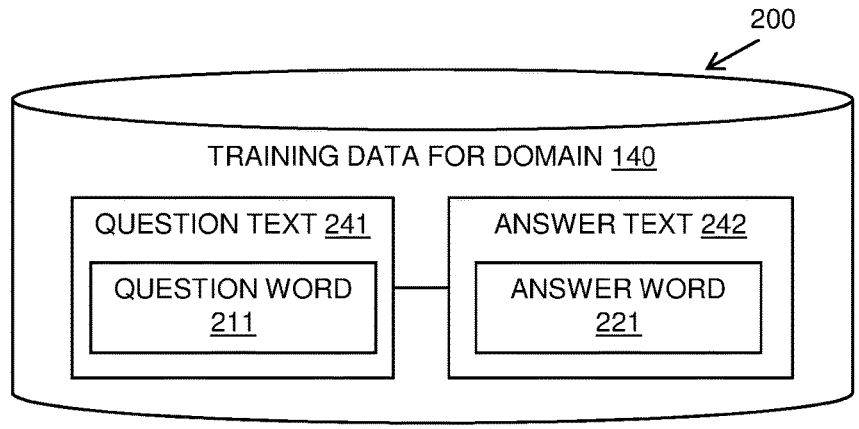
FIGS. 2A-2C are schematic diagrams of an example embodiment illustrating generating a graph in accordance with the present disclosure.

Referring to FIG. 2A, a schematic diagram 200 illustrates an example embodiment of the aspect of generating a question and answer graph 150 from a set of training data 140 for a domain.

The set of training data 140 is a ground truth in the form of a set of question texts 241 with associated answer texts 242. The question texts 241 are made up of question words 211 and the answer texts 242 are made up of answer words 221. Such training data is known from training a question-answer or information retrieval system to improve the rank of correct answers. An example set of training data may include data sets from approximately 140 to 50,000 question-answer pairs, but there is no minimum required or maximum permitted number of examples, in order for this method to be used. As the number of examples provided increases, however, the likelihood of unseen question vocabulary appearing in the graph increases, which will in turn increase the relevancy of the returned top n answer word expansions for the user's input.

The question texts 241 are authored by real intended users of the system and describe the common types of phrases and vocabulary representative of typical users. The associated answer texts 242 are taken from the corpus of documents from which answers or search results will be retrieved.

Training a question-answer or information retrieval system relies on subject matter experts to provide these question texts 241 and correct answer texts 242. This is a primary source ground truth data that is available in training enterprise systems. Depending on the technique that uses such data, more or less of this type of data may be used in order to produce improvements in search results. This technique does not have a minimum required or maximum permitted number of examples.

The question vocabulary 210 in the question texts 241 and the answer vocabulary 220 in the answer texts 242 are evaluated to restrict to disjoint question-answer word pairs. Disjoint question-answer word pairs are pairs of words that do not occur in both a training question text 241 and an associated training answer text 242. In some embodiments, the answer words 221 may be restricted to words that are in an answer text 242 but are not included in the question text 241.

Figure 2B:
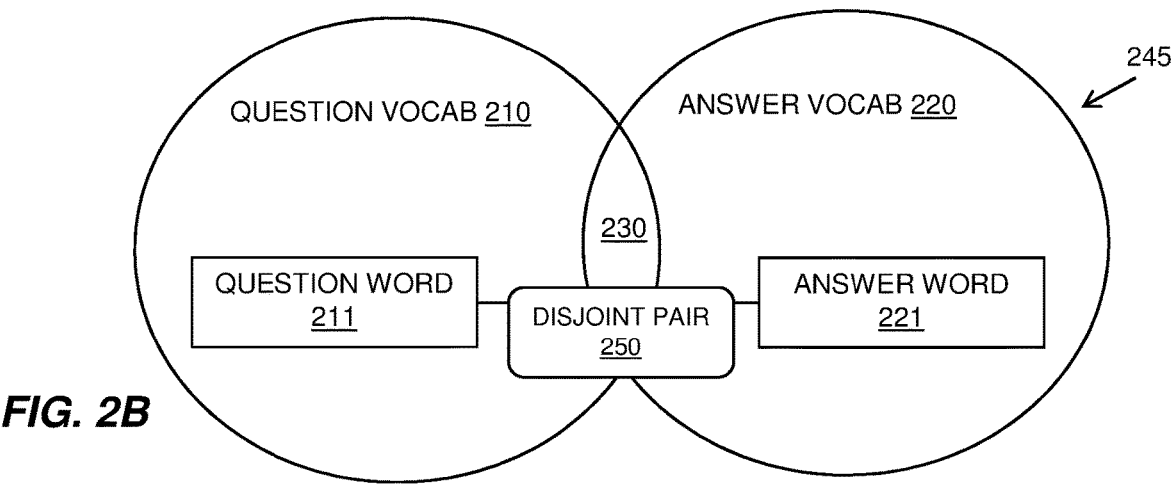

Referring to FIG. 2B, these disjoint question-answer word pairs may be considered in the context of a Venn diagram 245 shown for illustrative purposes. Question vocabulary 210 and answer vocabulary 220 are shown as two separate sets of words that sometimes overlap, shown in the Venn diagram 245 as the overlap 230. The overlap 230 or intersection of these two sets is the "conjoint" vocabulary, and this conjoint vocabulary set is the normal basis for search engines, where documents can be retrieved that directly contain these question words.

Known query expansion attempts to expand this intersection space, typically use synonyms or hyponyms (e.g., "Labrador"="dog") or domain-specific knowledge (e.g., "paracetamol=Tylenol" (Tylenol is a trademark of Johnson & Johnson)), but this process of expansion of the intersection typically relies on traditional semantic resources that describe human understandable or obvious semantic relationships, even including relatively distant relationships like "headache" as an expansion for "paracetamol", since paracetamol "treats" headaches.

Disjoint vocabulary, on the other hand, is the sets of words that are in the answer vocabulary 220 but are not in the associated question vocabulary 210. Answer words that are in the overlap 230 are not used for question-answer word pairs. Consequently, disjoint pairs 250 are the exhaustive combinations of the question words 211 and with disjoint answer words 221, between question text 241 and associated answer text 242.

The nature of these disjoint pairs 250 may not describe obvious semantic relationships, but nevertheless captures some aspect of the user's intent as expressed in their question, and which is answered by the vocabulary of the relevant answer. These may be considered to be non-obvious semantic relationships and prior art has ignored them. This phenomena can be demonstrated in examples like "delay" and "interval", which while both are time related, have no easily recognized or commonly extracted semantic relationship, and as such are extremely difficult to leverage as expansions using traditional techniques.

Figure 2C:
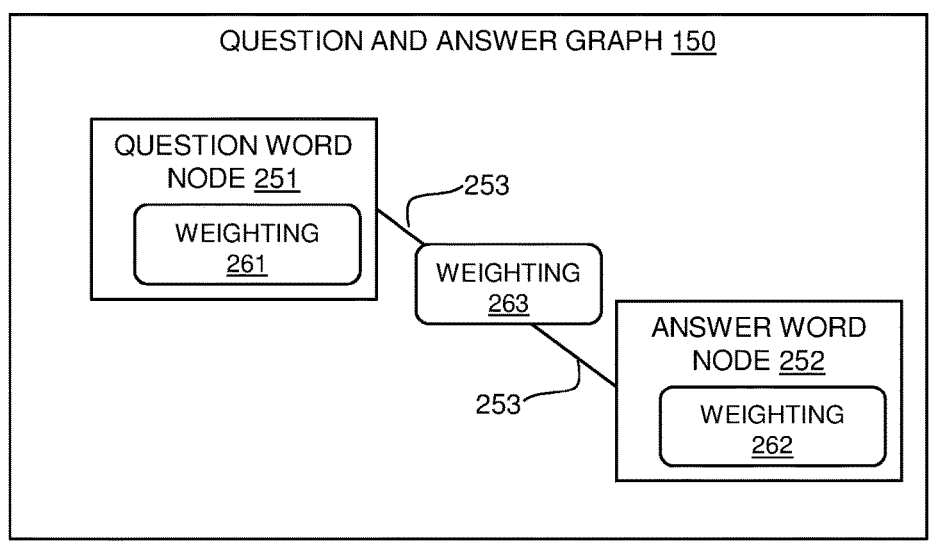

Referring to FIG. 2C, a question and answer graph 150 is built from the words in the set of training data 140 (shown in FIG. 2A). Question word nodes 251 may be provided for all the question words 211 in the question texts 241 of the training data 140, or a conditional selection of the question words 211 from the question texts 241 such as question words 211 with a part-of-speech, the frequency of a word in the domain corpus, stop words for the domain, etc.

Answer word nodes 252 are provided for the disjoint answer words 221 in the answer texts 242 of the training data 140. The disjoint answer words 221 are words that are not also in the vocabulary of the question texts 241.

Edges 253 are provided in the graph 150 between disjoint word pairs 250 in the form of a question word 211 and a disjoint answer word 221. Although there are no direct edges 253 between two answer word nodes 252, answer word nodes 252 may be only 1 node degree away from each other by virtue of the intervening question word node 251 that is linked to them both.

Node weightings 261, 262 are provided as the frequency of the word as a question word 211 or an answer word 221 in the set of training data 140.

Edge weighting 263 is provided as the frequency of the particular disjoint pair 250 across all question-answer data in the set of training data 140. This may be the frequency that a disjoint pair 250 of words is disjoint for each question-answer combination in the ground truth.

Each node 251, 252 or edge 253 stores an associated value for its weighting. These seed values are the basis for a mathematical formula that is applied as the spreading signal traverses these same nodes and edges during activation.

The graph 150 is activated for input words of an unseen user question with a signal that will move in all directions across all nodes 251, 252, in order to accumulate on the most relevant nodes in the graph 150 for the selected inputs. The signal is able to move freely across all nodes 251, 252 in the graph 150 that are directly and indirectly connected to the input words.

In one embodiment, part-of-speech (POS) tagging may be applied to question text 241 and/or answer text 242 in processing the training data 140. Edges may only be created between question and answer words that have the same POS tag (e.g. noun, verb, adjective, etc.). In this way, the graph activation may be forced to traverse same POS edges.

In some embodiments, when edges are added between question and answer word nodes, there may be additional relationships recognized in addition to the default relationship of "isDisjoint". Other types of edge that may be drawn between nodes may be, for example: "sameLanguage" or "differentLanguage", depending on question and associated answer sharing the same language; "carInsuranceRelated", "vanInsuranceRelated", or "houseInsuranceRelated", depending on the sub-topic of the question and associated answers, as determined by a separate topic classifier, model, or semantic labeling mechanism. When the same topic is recognized in a new user input, these edges may be traversed with different weightings, according to their significance to the input.

Figure 3:
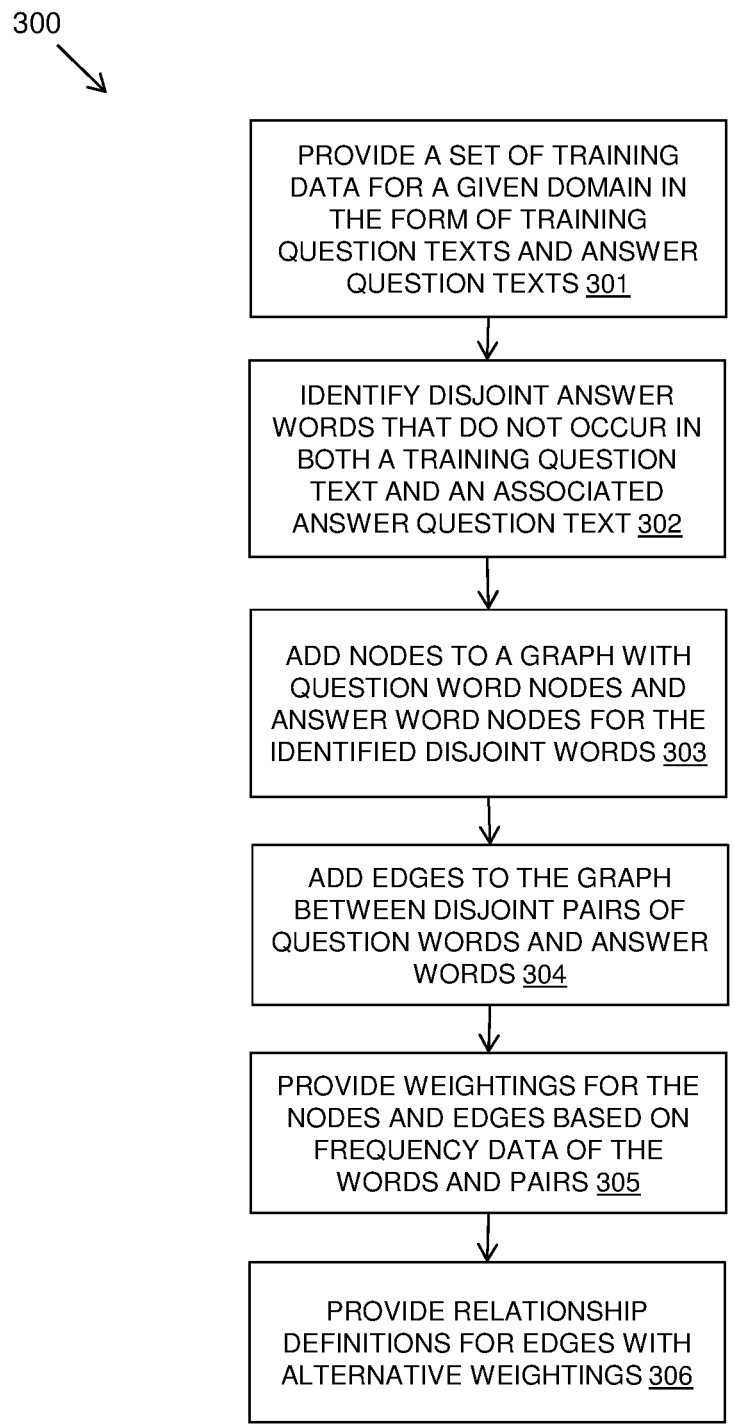
FIG. 3 is a flow diagram of an example embodiment of an aspect of generating a graph for use in query expansion of a method in accordance with the present disclosure.

Referring to FIG. 3, a flow diagram 300 shows an example embodiment of an aspect of the described method of generating a graph of question and answer vocabulary for use in query expansion.

The method 300 provides 301 a set of training data in a given domain in the form of training question texts and training answer texts. Training data is provided in the form of a corpus of ground truths for a domain in the form of questions with known correct answers. The questions are authored by real intended users of the system and describe the common types of phrases and vocabulary representative of typical users. Associated answer texts are taken from the corpus of documents from which answers or search results will be retrieved for the targeted domain. Therefore, the answers are highly relevant in context but do not necessarily have any lexical or semantic link with the question text. A relatively small amount of training data is required for a ground truth for a domain. This is also easy to augment with additional question-answer pairs. The training data is targeted to the user's domain and the corpus being searched.

Disjoint answer words are identified 302 in the answer texts, where disjoint words are words that do not occur in an associated training question text as well as the training answer text. Disjoint pairs of words are provided between a word in a training question text and a word in an associated training answer text. There may be more than one associated training answer text for each question text.

A graph of disjoint question and answer vocabulary is built, which has nodes for vocabulary words of node types QuestionWord and AnswerWord. The method adds 303 nodes to the graph with question words as QuestionWord nodes and adds disjointed answer words as AnswerWord nodes for the identified disjoint words.

Words from the question vocabulary of the set of training data may become question word nodes regardless of whether they appear in answers or not. This is to fully capture the vocabulary of the task. In some embodiments, all question words may be included as question word nodes in the graph to ensure that hidden context is included from question text.

In other embodiments, there may be conditional selection of question words from question texts for inclusion as question word nodes. Such conditional selection may include various features. The features may include, as examples, one or more of: the requirement that the word has some pre-specified set of part-of-speech, the frequency of the term in a corpus, whether or not it is a stop word for the domain, whether the term appears in some domain vocabulary/ontology whether the word is a question word, etc. In another embodiment, the question word nodes may also be limited to disjoint words that are not included in an associated answer text.

In mathematics, graph theory uses mathematical structures to model pairwise relations between objects. A graph in this context is made up of question word nodes and answer word nodes which are connected by edges. A graph may be undirected, meaning that there is no distinction between the two vertices associated with each edge, or its edges may be directed from one vertex to another. In this embodiment, the graph is undirected.

The method 300 may add 304 edges to the graph between a disjoint pair of a question word in a training question and an answer word in an associated training answer. The use of disjoint pairs of question-answer words gives an unintuitive but yet meaningful linkage between a set of terms from inquiries representing a domain task and terms in other content (such as the search corpus) which are not retrievable by any heuristic approach such as employed in known methods.

The method 300 may provide 305 weightings for the nodes and edges based on frequency data of the words in the set of training data.

Weightings for the nodes may be provided by weighting the nodes by the frequency of occurrence of the question word of a question word node in the set of training data and the frequency of occurrence of the answer word of an answer word node in the set of training data.

Weightings of edges between nodes may be provided by weighting an edge according to the frequency of the disjoint question word and answer word pairs across the set of training data.

There are multiple ways to configure the graph for optimal results of spreading signal through the graph. For example, there may be conditional inclusion at the node level and/or this may be managed through the connectivity on the edges. In some embodiments, including everything by default with the spreading activation as described can give good results on real world tasks.

In some embodiments, the graph may be generated with only edges provided between question word and answer word pairs having lexical or semantic relationships. For example, the edges may only be created for question words and answer words having the same part-of-speech. This will restrict activation of the graph to the semantic relationship.

In some embodiments, the method may provide 306 relationship definitions for edges between question word and answer word pairs in the graph and may be configured to provide different weightings for each relationship definition of an edge.

The graph may be updated by augmenting the set of training data with additional or replacement questions. The graph may also be updated by receiving user feedback of the results of queries made using expanded queries using the graph as described further below.

Figure 4:
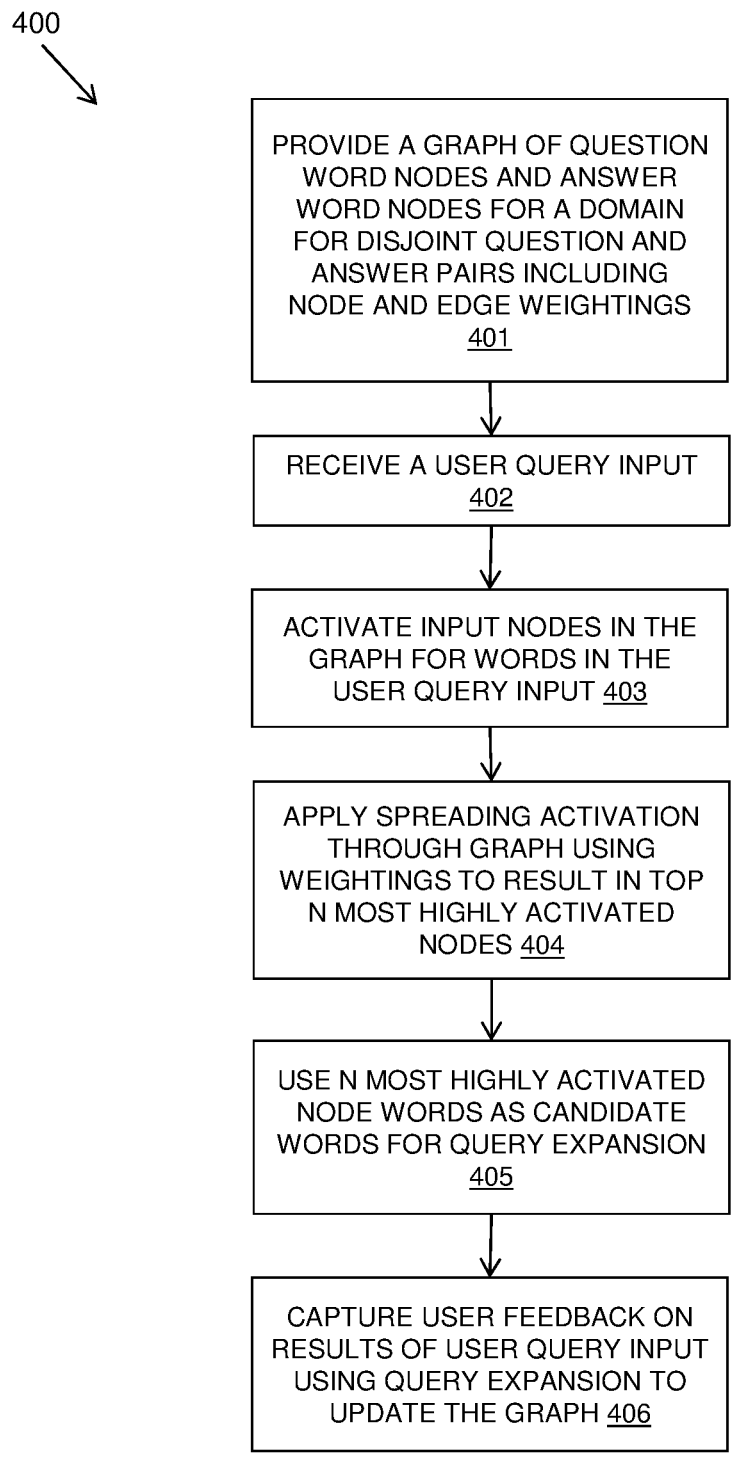
FIG. 4 is a flow diagram of an example embodiment of another aspect of applying a query expansion graph in query expansion of a method in accordance with the present disclosure.

Referring to FIG. 4, a flow diagram 400 shows an example embodiment of an aspect of the described method of expanding a query using a graph of question and answer vocabulary.

The method 400 may provide 401 a graph of question word nodes and answer word nodes generated for a set of training data for a given domain as generated in the method of FIG. 3. The graph includes question word nodes and answer word nodes. The answer word nodes are of disjoint words that do not occur in both a training question text and an associated training answer text. Edges are provided between disjoint pairs of a question word node for a question word in a training question and an answer word node for a disjoint answer word in an associated training answer. The graph includes weightings for the nodes and edges based on frequency data of the words in the set of training data.

The method 400 may receive 402 a user query input in the form of a set of words. A user query input may commonly be a question input; however, the query input may also include an answer input. The input nodes may be nodes with overlapping surface forms or lemma forms of the words in the user query input.

The method 400 may activate 403 input nodes in the graph for words in the user query input. The graph is activated using user input only. This can be in the form of a question, or a question and an associated answer for further context. Depending on the nature of the input, the appropriate nodes will be activated. If the query input is a question input, then activating input nodes activates question word nodes in the graph. If the query input also includes an answer input, activating input nodes may activate answer word nodes in the graph in addition to question word nodes.

The method 400 does not assume that the relationships between nodes would be humanly obvious, but that collectively, following the activation of the graph, there is a representation of the user intent, even if it is not immediately apparent. For this reason, all vocabulary of a user query input may be included in the graph by default without trying to assume that particular words are more or less helpful, initially. The activation of the graph and the distribution of weight across these connections is relied upon to determine if a given word is relevant or not.

The non-obvious relationships between vocabulary in questions and answers is an interesting factor in the described method 400. A word like "and" or a possessive marker "s" may be critical in a particular context, and it is not assumed that they should be removed simply because they are not obviously related. For example, the general nature of answers about capital cities may be to refer to multiple characteristics collectively, separated by the word "and", and this is something that is possible to capture in a graph of the present disclosure. The benefits are clear in the use of this technique in domains such as legal, insurance, medical, financial, etc.

The method 400 may apply 404 spreading activation through the graph using the weightings to result in a top n most highly activated nodes. Applying spreading activation propagates a signal in all directions across question word nodes and answer word nodes that are directly or indirectly connected to the input nodes. The spreading activation weight improves information retrieval by allowing context sensitive ranking.

Lexical and semantic constraints may be applied when applying the spreading activation to expand using same lexical or semantic constraints only, such as the same part-of-speech only.

In some embodiments, when edges are added between question and answer words, there may be additional relationships recognized in addition to the default relationship of being disjoint pairs. Other types of edge that may be drawn between nodes may be: "sameLanguage" or "differentLanguage", depending on question and associated answer sharing the same language; "carInsuranceRelated", "vanInsuranceRelated", or "houseInsuranceRelated", depending on the sub-topic of the question and associated answers. When the same topic is recognized in a new user input, these edges may be traversed with different weight according to their significance in the input.

The method 400 uses 405 the n most highly activated nodes as candidate words for expansion of the user query input. This provides context relevant top n words for expansion. A search query may be augmented with most relevant expansion candidates.

The method 400 may select the top n question or answer word nodes. However, in some embodiments, only answer word nodes are selected as these have the advantage of leveraging answer words that are guaranteed to exist in the background retrieval corpus, whereas this is not always true for question words.

In the case of a user query input including an answer input in addition to a question input, this query expansion may refine search results to a style of answer, for which a sample answer may be provided. In this case, both QuestionWord and AnswerWord nodes can be activated at first. After activation, the signal may traverse the graph from those points and accumulate at other nodes in the graph, which is then used as a relevance measure.

The method 400 may include capturing 406 user feedback on results of a user query input into a search engine using the candidate words for expansion and using the user feedback to supplement the set of training data.

A search system in which an expanded query generated by the described method 400 is entered may capture user feedback, such as a thumbs rating or a star rating on an answer to a question. This feedback data may be used to supplement the initial ground truth question-answer data, and thereby improve or adapt the system over time.

Since the initial ground truth is authored by experts, it is normally considered a gold standard and more reliable than raw user feedback. Therefore, the use of the user feedback loop to improve a search system is can be controlled, for example, by monitoring particular trusted authors only, or applying a voting system and a threshold of trustworthiness before inclusion. This use of feedback to improve the system can be a much cheaper method of integrating user data than other techniques for query expansion.

The frequencies of the nodes and edges in the graph may be augmented with the additional counts from the provided feedback data, so new nodes may be added for any previously unseen question or answer words and/or new edges may be drawn between question and answer pairs that were not seen in previous ground truth data. This process of iterative updating of the graph can be very cheap and computationally efficient to perform as the associated actions in updating the graph do not require a deep retraining or recalculation of feature vectors or other data as is the case in other techniques, such as deep learning methods.

Once a user gives a positive rating, such as a thumbs up or a high star rating, to a particular answer or answers in a search result, this answer and its associated question can be sent to the underlying query expansion graph and the data used as a supplementary question-answer data to augment the data already there with additional nodes, edges, and/or frequency counts, as described above.

The graph provides a network of possible connections between vocabulary that, when activated with content of an unseen question, can predict the best set of expansions that existed in correct answers in the set of vocabulary where there was no overlap between the question and the answer. This provides user driven query expansion through activation of disjoint question-answer pairs.

The output is the most relevant to all the sub-elements of the user query. Using an expanded query as described, the search for relevant documents can be improved. This is due to the focus on contextual gaps in user knowledge or vocabulary. The described method 400 produces statistically relevant expansions as distinct from semantic expansions. The expansions reflect the semantics of user intent rather than content semantics. The method 400 leverages ambient context of the mappings extracted from the user-authored ground truth. Additional user content can result in more accurate representations of context.

Connections like [mortgage->build] or [delay->interval] are now possible even though they do not have the same part of speech, are not synonyms, are not easily discoverable by existing methods, and do not overlap between contexts provided by user data (e.g., queries and answers).

Although the method 400 may depend on the hard-coded nature of question-answer pairs from a ground truth source, this is much more flexible than a method of hardcoding explicit expansion pairs.

An improved solution to this problem should increase the relevance of expansions by generating relevant expansions only and by not producing expansions that do not exist in the target corpus. An improved solution should also reduce over-inflation of recall by having an effective ranking of top n expansions.

The described method 400 allows for easy adaptation to new domains or user contexts by updating the set of training data. The training data may also be used to target expansions that solve inherent gaps in user knowledge by linking user question vocabulary to correct answers.

Figure 5:
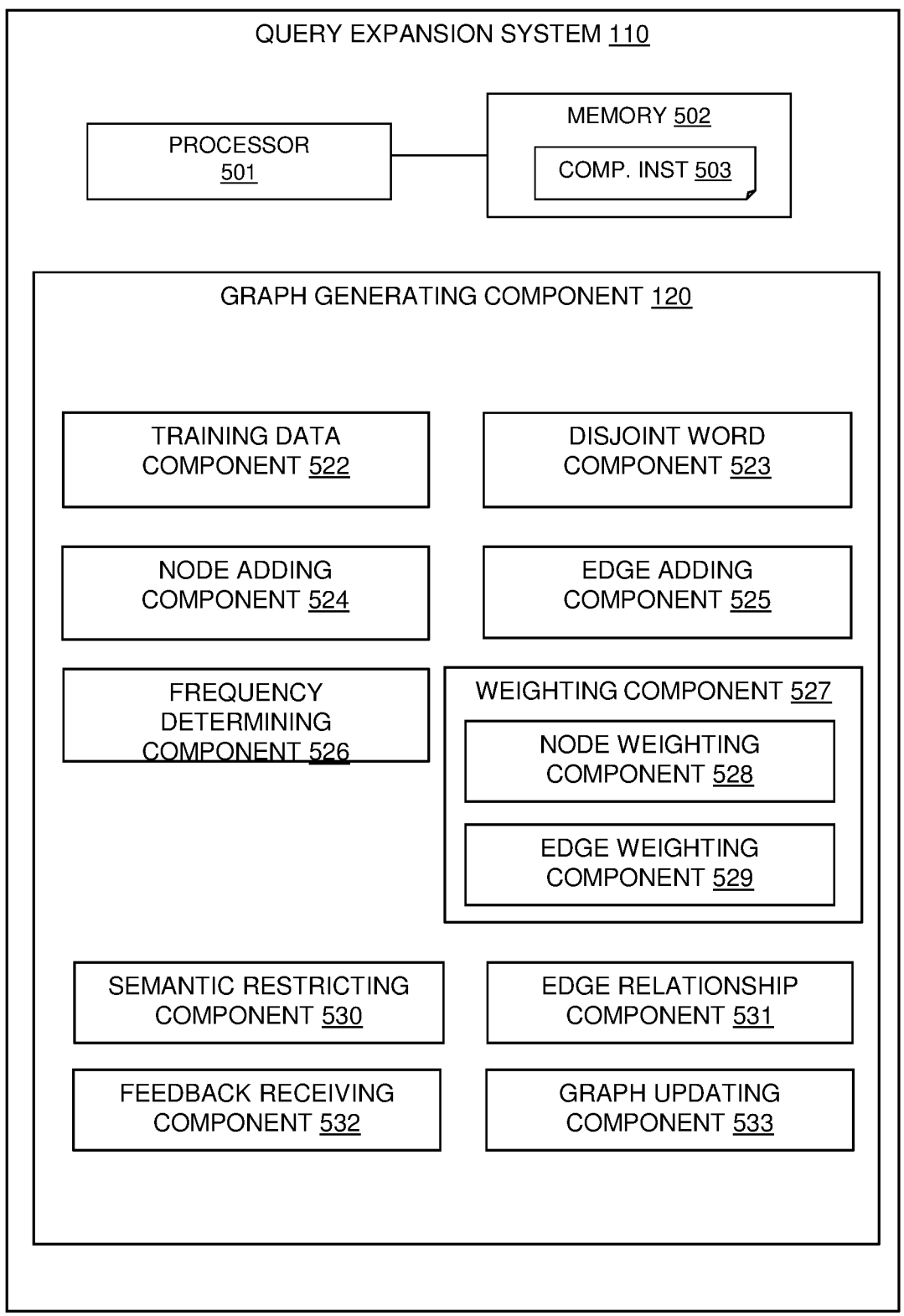
FIG. 5 is a block diagram of an example embodiment of a query expansion graph generating system in accordance with the present disclosure.

Referring to FIG. 5, a block diagram shows an example embodiment of the described query expansion system 110 with components providing the functionality of the graph generating component 120.

In the illustrated embodiment, the query expansion system 110 includes at least one processor 501 (or a hardware module or a circuit) for executing the functions of the described components, which may be software units executing on processor 501. In some embodiments, multiple processors 501 running parallel processing threads may be provided, enabling parallel processing of some or all of the functions of the components. Memory 502 may be configured to provide computer instructions 503 to the at least one processor 501 to carry out the functionality of the components, such as the graph generating component 120 depicted in FIG. 5 and the graph applying component 130 depicted in FIG. 6.

In the illustrated embodiment, the graph generating component 120 includes a training data component 522, for providing a set of training data in a given domain in the form of training question texts and training answer texts, and a disjoint word component 523, for identifying disjoint answer words in a training answer text that do not occur in an associated training question text.

In the illustrated embodiment, the graph generating component 120 includes a node adding component 524 for adding nodes to a graph as question word nodes and answer word nodes. The answer word nodes may be for the identified disjoint answer words in the set of training data. The graph generating component 120 may include an edge adding component 525 for adding edges between a disjoint pair of a question word in a training question and a disjoint answer word in an associated training answer.

In the illustrated embodiment, the graph generating component 120 includes a frequency determining component 526, for determining frequency data of words and disjoint word pairs in the set of training data, and a weighting component 527, for providing weightings for the nodes and edges based on frequency data of the words in the set of training data. The weighting component 527 includes a node weighting component 528 for providing weightings for the nodes, the node weighting component 528 being configured to weight the nodes by the frequency of occurrence of the question word of a question word node in the set of training data and the frequency of occurrence of the answer word of an answer word node in the set of training data. The weighting component 527 also includes an edge weighting component 529 for providing weightings of edges between nodes configured to weight an edge according to the frequency of the disjoint question word and answer word pair across the set of training data.

In the illustrated embodiment, the graph generating component 120 includes a semantic restricting component 530 for providing the graph with edges restricted between question word and answer word pairs to question words and answer words having lexical or semantic relationships. The graph generating component 120 also includes an edge relationship component 531 for providing relationship definitions for edges between question word and answer word pairs and providing different weightings for each relationship definition of an edge. The graph generating component 120 also includes a feedback receiving component 532 for receiving user feedback on results of a user query input into a search engine using the candidate words for expansion, and a graph updating component 533 for applying the user feedback to the graph.

Figure 6:
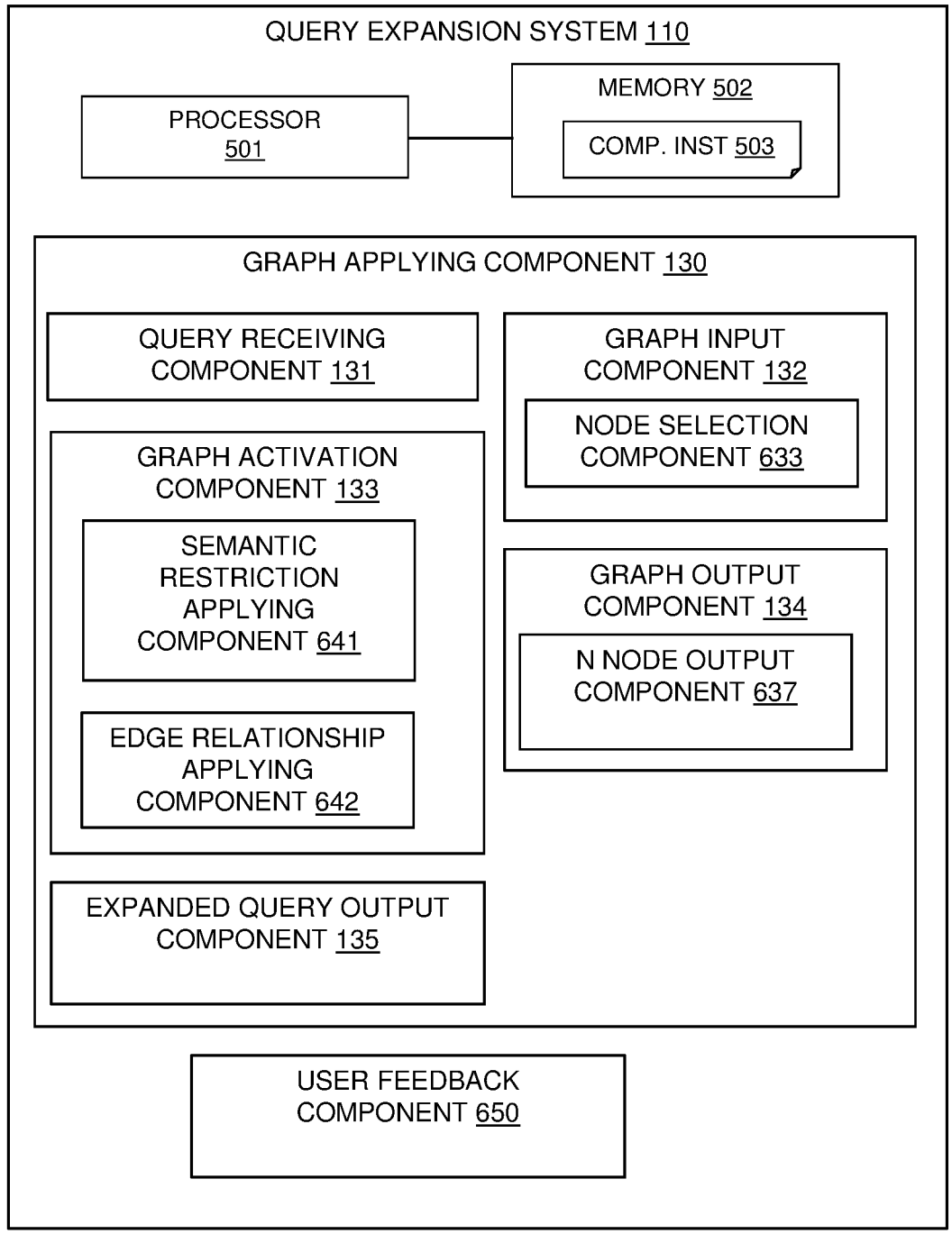
FIG. 6 is a block diagram of an example embodiment of a query expansion graph applying system in accordance with the present disclosure.

Referring to FIG. 6, a block diagram shows an example embodiment of the described query expansion system 110 with components providing the functionality of the graph applying component 130.

In the illustrated embodiment, the graph applying component 130 includes a query receiving component 131 for receiving a user query input and a graph input component 132 for activating input nodes in the graph for words in the user query input by a node selection component 633. The user query input may be a question input and/or an answer input, and the graph input component 132 may activate question word nodes and/or answer word nodes.

In the illustrated embodiment, the graph applying component 130 includes a graph activation component 133, for applying spreading activation through the graph from the input nodes using the weightings of the nodes and edges, and a graph output component 134, for returning a result of a top n most highly activated nodes by an n node output component 637. The words of the output nodes may be used in an expanded query output component 135 as candidate words for expansion of the user query input.

If a user query input includes an answer input in addition to a question input, this may refine search results to a style of answer. In this case, the graph output component 134 may return a result of a top n most highly activated nodes that are used as candidate words for refinement of the search results to an answer style.

In the illustrated embodiment, the graph activation component 133 includes a semantic restriction applying component 641 wherein the graph has edges restricted between question word and answer word pairs to question words and answer words having lexical or semantic relationships. The graph activation component 133 also includes an edge relationship applying component 642 for applying provided relationship definitions for edges between question word and answer word pairs and providing different weightings for each relationship definition of an edge.

In the illustrated embodiment, the query expansion system 110 includes a user feedback component 650 for capturing user feedback on results of a user query input into a search engine using the candidate words for expansion, and the user feedback may be used to supplement the set of training data resulting in an updated graph.

The described query expansion system 110 including a graph generating component 120 (shown in FIG. 5) and a graph applying component 130 may be introduced into existing search systems without re-architecture. This may be provided as part of front-end query building and does not affect a background index. The described query expansion system 100 (shown in FIG. 1) may act as a domain-customization interface on any existing search system including open-source systems.

Example

Training Data

Question-answer data is a map that leads from question text to potentially multiple correct answers. The more such examples that are provided, the better the depth of relationships between vocabulary in the graph, and the better the graph can potentially recommend expansions for a new unseen context. The examples used here are contrived for simplicity in order to demonstrate the mechanism independently of the inherent value of graph depth:

Question: "Is Dublin the capital city of Ireland?"
Answers: ["Ireland's capital and largest city by population is Dublin", "Dublin is the biggest city and capital of Ireland"]
Question: "What type of animal is a lion?"
Answers: ["The lion is the largest cat in Africa.", "The lion is an animal in the cat family."]

The question words that may be added to a graph as question word nodes are underlined and the disjoint answer words that may be added to the graph as answer word nodes are underlined. This illustrates that as "Ireland" is in the question text, it is not included as an answer word for an answer word node in the graph.

Surface forms and lemmas are converted to nodes of type QuestionWord. For example, "be" is the lemma form of "is", "large" is the lemma form of "largest", and "big" is the lemma form of "biggest".

Disjoint Question-Answer Pairs

Figure 7:
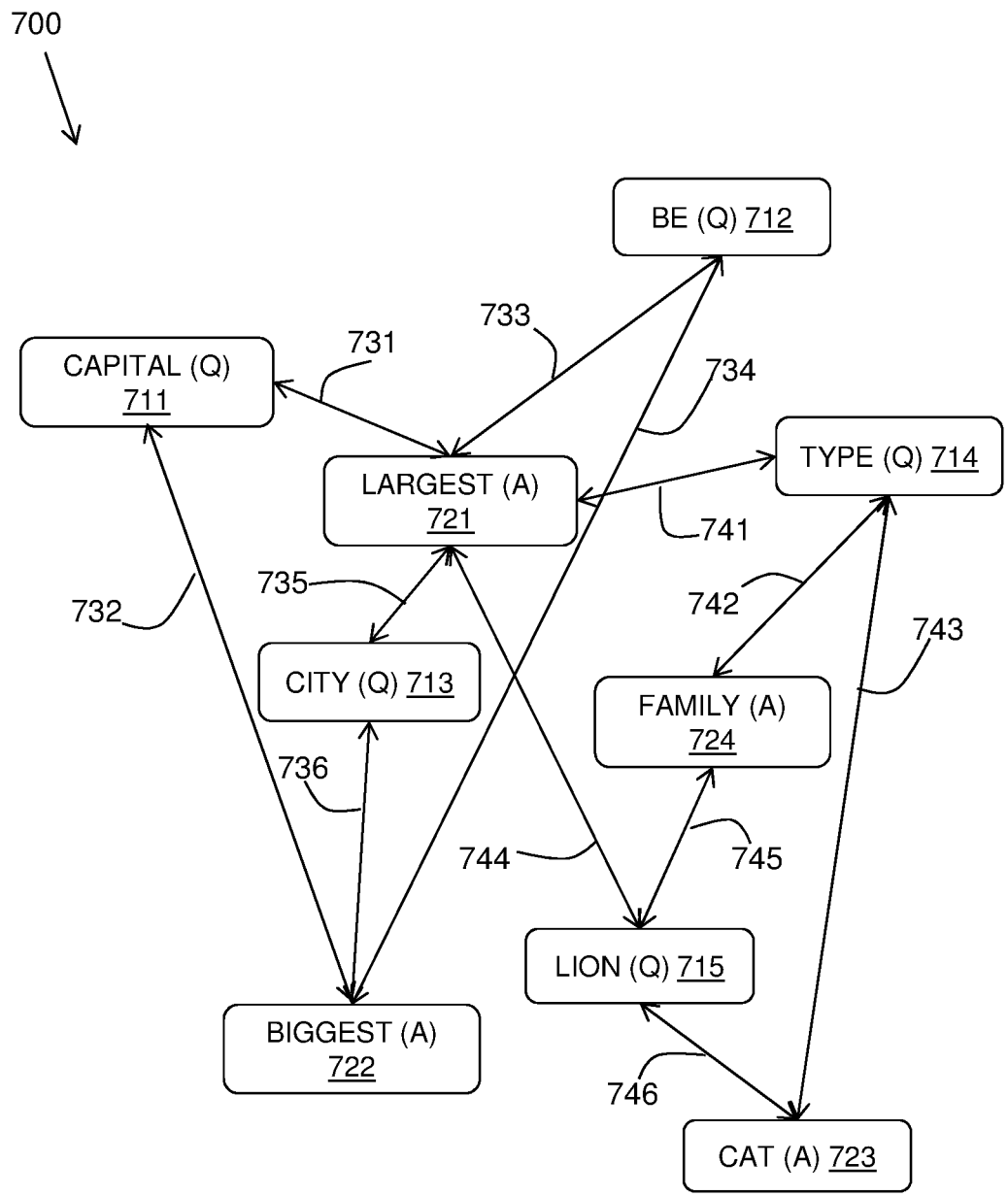
FIG. 7 is a schematic diagram illustrating a graph for query expansion in accordance with an embodiment of the present disclosure.

The set of pairs generated from this input, along with their frequencies, are then used to build the graph. The following is an example list of the (51) edges between all (17) nodes, from the above example data set:

capital->largest
capital->big
capital->large
capital->biggest
capital->population
be->largest
be->big
be->large
be->biggest
be->population
dublin->largest
dublin->big
dublin->large
dublin->biggest
dublin->population
city->largest
city->big
city->large
city->biggest
city->population
is->largest
is->big
is->large
is->biggest
is->population
ireland->largest
ireland->big
ireland->large
ireland->biggest
ireland->population
be->africa
be->cat
be->family
animal->largest
animal->africa
animal->large
animal->cat
animal->family
is->africa
is->cat
is->family
type->largest
type->africa
type->large
type->cat
type->family
lion->largest
lion->africa
lion->large
lion->cat
lion->family FIG. 7 shows an extract of an example graph 700 of question and answer vocabulary for the above example. Not all the nodes for the example are shown for purposes of clarity.

Example QuestionWord nodes are shown for the question words of "capital" 711, "be" 712, "city" 713, "type" 714, "lion" 715 and example AnswerWord nodes are shown for the disjoint answer words of "largest" 721, "biggest" 722, "cat" 723, "family" 724.

Example edges are shown in the graph 700 as follows:
capital->largest 731
capital->biggest 732
be->largest 733
be->biggest 734
city->largest 735
city->biggest 736
type->largest 741
type->family 742
type->cat 743
lion->largest 744
lion->family 745
lion->cat 746

Nodes 711-715 and 721-724 and edges 731-746 have weightings based on the frequency of words in the data set and frequency of the disjoint pairs. For example, the weighting of the question word "capital" 711 may be based on a frequency measure of its presence in the question and answer vocabulary. The weighting of edges may be based on a frequency measure of the question-answer pair across the question-answer data. In this simplified example, the edge 733 of "be->largest" and the edge 734 of "be->biggest" both appear twice in the question-answer data and will therefore have a higher weighting than if they had appeared once in the question-answer data.

Unseen Input Questions and Results

Sample unseen questions and the n=5 expansions that are produced following graph activation are as follows:
Question 1: "What is the capital of India?"
Expansions: ["big", "biggest", "population", "largest", "large"]
Question 2: "What is a lion?"
Expansions: ["africa", "cat", "family", "largest", "large"]
The graph 700 may be activated with question nodes corresponding to the question words in the sample unseen questions, such as "capital" 711, "be" 712 (as a lemma of "is") in Question 1 and "lion" 715, "be" 712 (as a lemma form of "is") in Question 2.

The results of the activation of the graph 700 are the activated nodes of "big", "biggest", "population", "largest", "large" of Question 1 and "africa", "cat", "family", "largest", "large" for Question 2.

Figure 8:
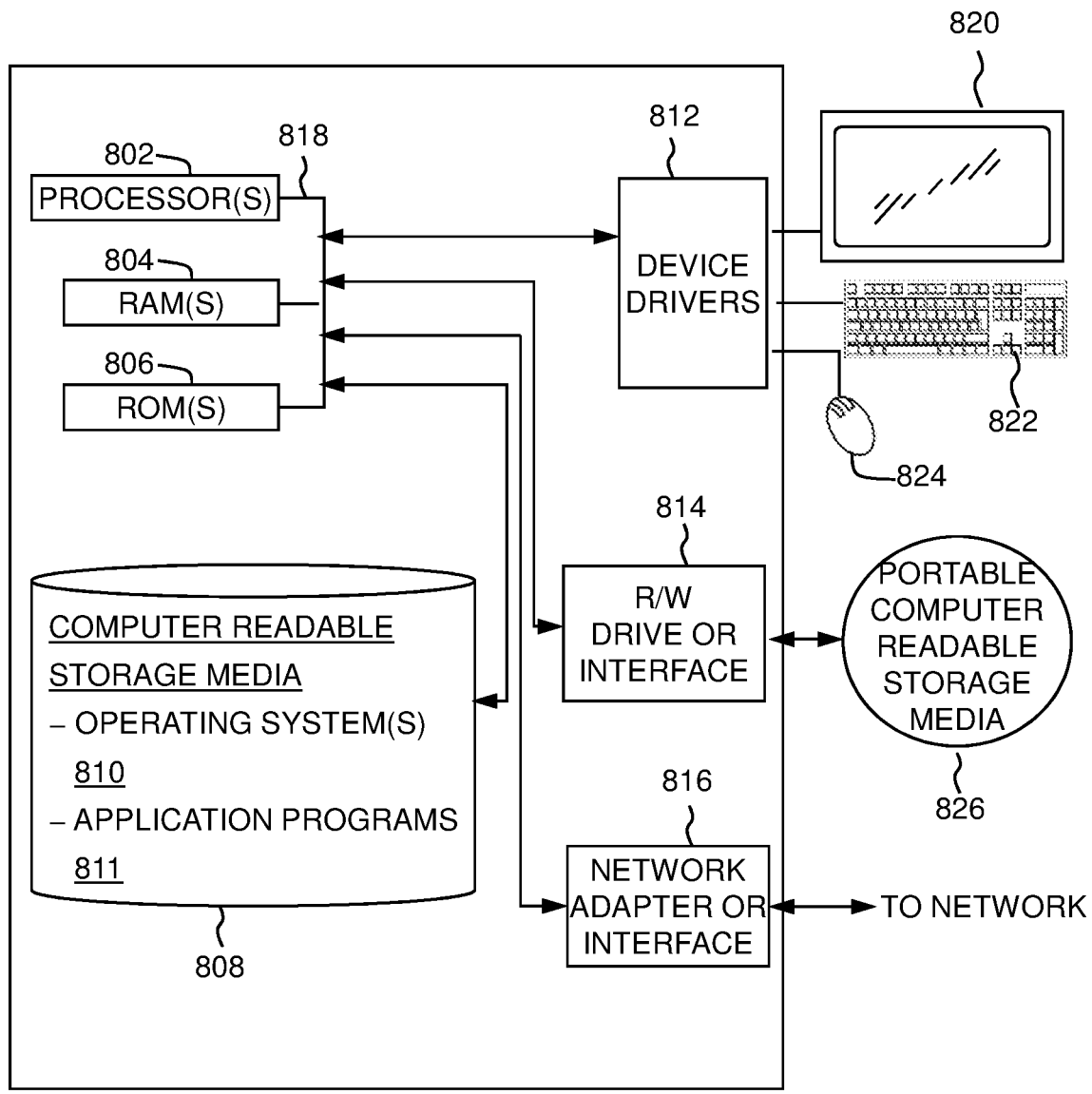
FIG. 8 is a block diagram of an embodiment of a computer system or cloud server in which the present disclosure may be implemented.

FIG. 8 depicts a block diagram of components of the computing device of the query expansion system 110 of FIG. 1, in accordance with an embodiment of the present disclosure. It should be appreciated that FIG. 8 provides only an illustration of one implementation and does not imply any limitations with regard to the environments in which different embodiments may be implemented. Many modifications to the depicted environment may be made.

Computing device can include one or more processors 802, one or more computer-readable RAMs 804, one or more computer-readable ROMs 806, one or more computer readable storage media 808, device drivers 812, read/write drive or interface 814, and network adapter or interface 816, all interconnected over a communications fabric 818. Communications fabric 818 can be implemented with any architecture designed for passing data and/or control information between processors (such as microprocessors, communications and network processors, etc.), system memory, peripheral devices, and any other hardware components within the system.

One or more operating systems 810, and application programs 811, are stored on one or more of the computer readable storage media 808 for execution by one or more of the processors 802 via one or more of the respective RAMs 804 (which typically include cache memory). In the illustrated embodiment, each of the computer readable storage media 808 can be a magnetic disk storage device of an internal hard drive, CD-ROM, DVD, memory stick, magnetic tape, magnetic disk, optical disk, a semiconductor storage device such as RAM, ROM, EPROM, flash memory, or any other computer readable storage media that can store a computer program and digital information, in accordance with embodiments of the disclosure.

Computing device can also include a R/W drive or interface 814 to read from and write to one or more portable computer readable storage media 826. Application programs 811 on computing device can be stored on one or more of the portable computer readable storage media 826, read via the respective R/W drive or interface 814 and loaded into the respective computer readable storage media 808.

Computing device can also include a network adapter or interface 816, such as a TCP/IP adapter card or wireless communication adapter. Application programs 811 on computing device can be downloaded to the computing device from an external computer or external storage device via a network (for example, the Internet, a local area network or other wide area networks or wireless networks) and network adapter or interface 816. From the network adapter or interface 816, the programs may be loaded into the computer readable storage media 808. The network may comprise copper wires, optical fibers, wireless transmission, routers, firewalls, switches, gateway computers and edge servers.

Computing device can also include a display screen 820, a keyboard or keypad 822, and a computer mouse or touchpad 824. Device drivers 812 interface to display screen 820 for imaging, to keyboard or keypad 822, to computer mouse or touchpad 824, and/or to display screen 820 for pressure sensing of alphanumeric character entry and user selections. The device drivers 812, R/W drive or interface 814, and network adapter or interface 816 can comprise hardware and software stored in computer readable storage media 808 and/or ROM 806.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN)

or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Cloud Computing

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 9:
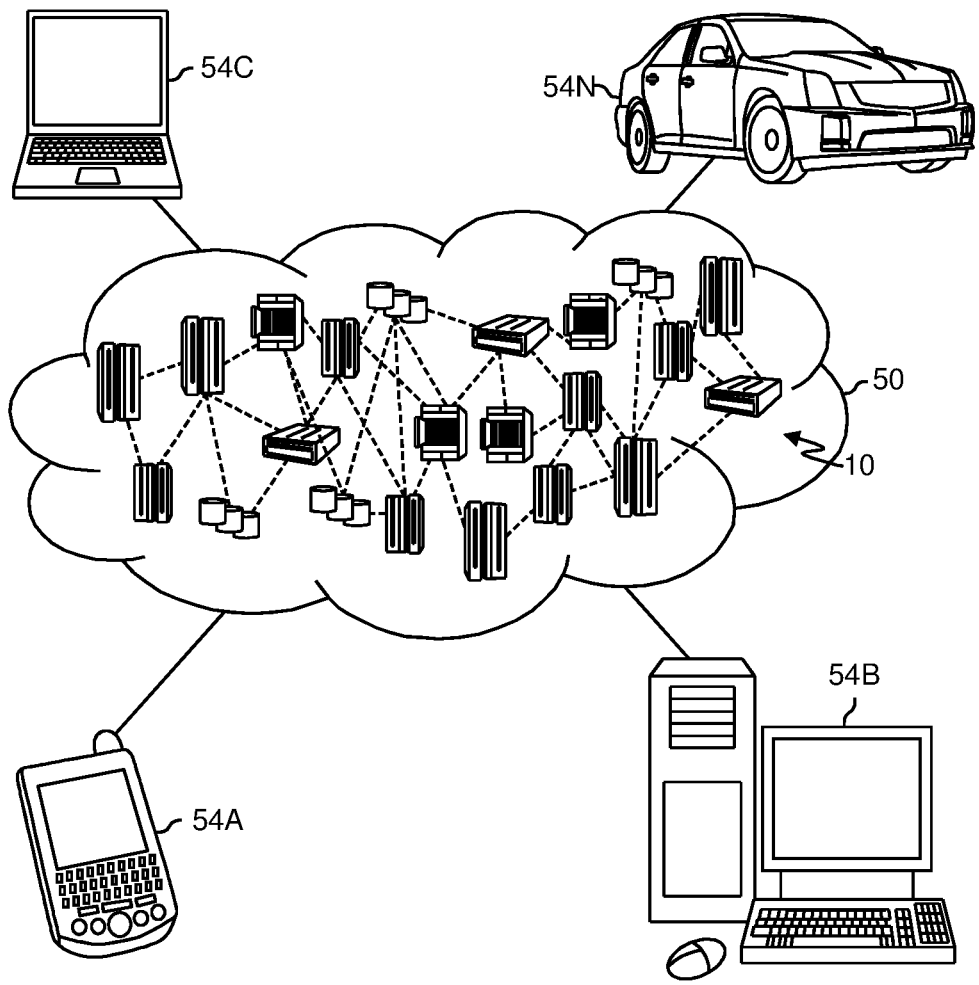
FIG. 9 is a schematic diagram of a cloud computing environment in which the present disclosure may be implemented.

Referring now to FIG. 9, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 9 are intended to be illustrative only and that computing nodes 10 and cloud computing environment 50 can communicate with any type of computerized device over any type of network and/or network addressable connection (e.g., using a web browser).

Figure 10:
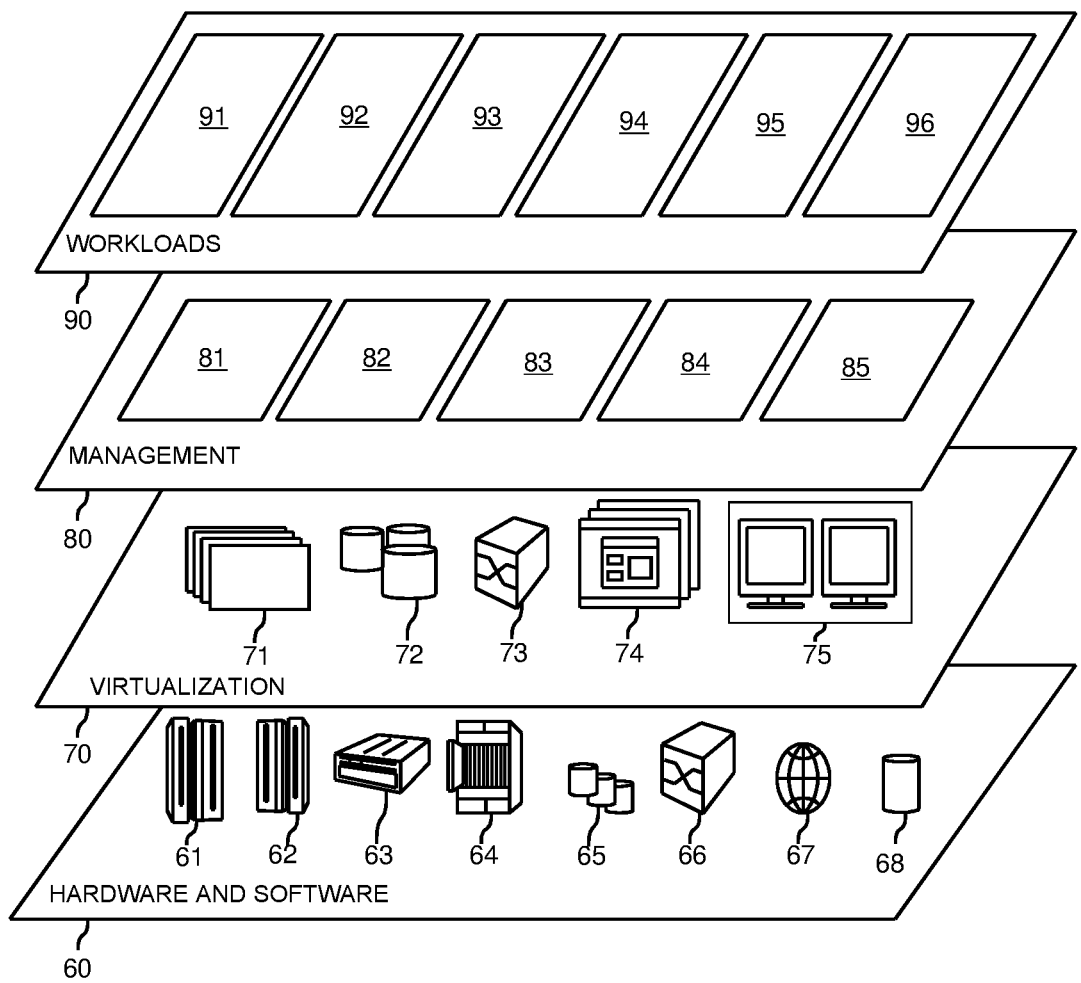
FIG. 10 is a diagram of abstraction model layers of a cloud computing environment in which the present disclosure may be implemented.

Referring now to FIG. 10, a set of functional abstraction layers provided by cloud computing environment 50 (FIG. 9) is shown. It should be understood in advance that the components, layers, and functions shown in FIG. 10 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and query expansion processing 96.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Improvements and modifications can be made to the foregoing without departing from the scope of the present invention.

What is claimed is:

1. A computer-implemented method for query expansion using a graph of question and answer vocabulary, the method comprising:

providing a set of training data in a given domain in the form of training question texts and training answer texts;

identifying disjoint answer words in the training answer text that do not occur in the associated training question text;

generating a graph of question word nodes and answer word nodes generated from the set of training data for the given domain in the form of the training question texts and the training answer texts, wherein edges are provided between a disjoint pair of a question word node for a question word in a training question and an answer word node for a disjoint answer word in an associated training answer;

receiving a user query input a search engine;

activating input nodes in the graph for at least some words in the user query input;

applying spreading activation through the graph to propagate a signal which activates nodes, in the graph for at least some words in the user query input, to generate candidate words for expansion of the user query input; and providing the candidate words to the search engine for expansion of the user query input.

2. The method as claimed in claim 1, wherein applying spreading activation, propagates the signal in all directions across question word nodes and answer word nodes that are directly or indirectly connected to activated input nodes.

3. The method as claimed in claim 1, further comprising capturing user feedback on results of the user query input into a search engine using the candidate words for expansion and using the user feedback to update the graph.

4. The method as claimed in claim 1, wherein the user query input is a question input and activation of input nodes activates question word nodes.

5. The method as claimed in claim 4, wherein the user query input includes an answer input in addition to the question input and activation of input nodes activates answer word nodes in addition to the question word nodes.

6. The method as claimed in claim 5, wherein the user query input includes an answer input in addition to a question input to refine search results to a style of answer and the candidate words are used for refinement of the search results to an answer style.

7. The method as claimed in claim 1, wherein activation of input nodes in the graph activates nodes with overlapping surface forms and lemma forms of the words in the user query input.

8. The method as claimed in claim 1, wherein activation of input nodes in the graph applies edge relationship definitions for edges between question word and answer word pairs with different weightings for each relationship definition of an edge.

9. The method as claimed in claim 1, wherein generating the graph comprises:
adding nodes to the graph as question word nodes and answer word nodes, wherein the answer word nodes are for the identified disjoint words in the set of training data; and
adding edges between a disjoint pair of a question word in a training question and a disjoint answer word in an associated training answer.

10. A computer-implemented method for query expansion using a graph of question and answer vocabulary, the method comprising:
providing a set of training data in a given domain in the form of training question texts and training answer texts;
identifying disjoint answer words in a training answer text that do not occur in an associated training question text;
adding nodes to a graph as question word nodes and answer word nodes, wherein the answer word nodes are for the identified disjoint answer words in the set of training data;
adding edges to the graph between a disjoint pair of a question word in a training question and a disjoint answer word in an associated training answer;
receiving a user query input for a search engine,
activating input nodes in the graph for at least some words in the user query input;
applying spreading activation through the graph to propagate a signal which activates nodes, in the graph for at least some words in the user query input that are output as candidate words for expansion of the user query input; and
providing the candidate words to the search engine for expansion of a user query input.

11. The method as claimed in claim 10, wherein adding edges to the graph comprises creating edges only between question word and answer word pairs with the question words and answer words having lexical or semantic relationships.

12. The method as claimed in claim 10, wherein providing the graph includes providing relationship definitions for edges between question word and answer word pairs and providing a different weighting for at least one relationship definition of one edge.

13. The method as claimed in claim 10, wherein adding nodes to the graph as question word nodes comprises conditionally selecting words from the training question texts according to predefined constraints.

14. A system for query expansion using a graph of question and answer vocabulary, the system comprising:
a processor; and
a memory communicatively coupled to the processor and configured to store computer program instructions;
wherein the processor is configured to execute the computer program instructions to:
provide a set of training data in a given domain in the form of training question texts and training answer texts;
identify disjoint answer words in the training answer text that do not occur in the associated training question text;
generate a graph of question word nodes and answer word nodes generated from the set of training data for the given domain in the form of the training question texts and the training answer texts, wherein edges are provided between a disjoint pair of a question word node for a question word in a training question and an answer word node for a disjoint answer word in an associated training answer;
receive a user query input for a search engine;
activate input nodes in the graph for at least some words in the user query input;
apply spreading activation through the graph to propagate a signal which activates nodes, in the graph for at least some words in the user query input, that are output as candidate words for expansion of a user query input; and
provide the candidate words to the search engine for expansion of the user query input.

15. The system as claimed in claim 14, wherein:
the processor is further configured to capture user feedback on results of a user query input into a search engine using the candidate words for expansion and to update the graph using the user feedback; and
the captured user feedback is only from particular trusted authors.

16. The system as claimed in claim 14, wherein generating the graph comprises:
adding nodes to the graph as question word nodes and answer word nodes, wherein the answer word nodes are for the identified disjoint words in the set of training data; and adding edges between a disjoint pair of a question word in a training question and a disjoint answer word in an associated training answer.

17. The system as claimed in claim 14, wherein the user query input is a question input, and/or an answer input and a graph input component activates question word nodes and/or answer word nodes.

18. The system as claimed in claim 17, wherein a user query input includes an answer input in addition to the question input to refine search results to a style of answer, and wherein a graph output component returns a result of activated nodes that are used as candidate words for refinement of the search results to an answer style.

19. A system for query expansion using a graph of question and answer vocabulary, the system comprising:
a processor; and
a memory communicatively coupled to the processor and configured to store computer program instructions;
wherein the processor is configured to execute the computer program instructions to:
provide a set of training data in a given domain in the form of training question texts and training answer texts;
identify disjoint answer words in a training answer text that do not occur in both an associated training question text;
add nodes to a graph as question word nodes and answer word nodes, wherein the answer word nodes are for the identified disjoint answer words in the set of training data; and
add edges between a disjoint pair of a question word in a training question and a disjoint answer word in an associated training answer;
receive a user query for a search engine;
apply spreading activation through the graph to propagate a signal which activates nodes which activates input nodes in the graph for at least some words in the user query input that are output as candidate words for expansion of the user query input;
return a result of activated nodes that are output as candidate words; and
provide the candidate words to the search engine for expansion of the user query input.

20. The system as claimed in claim 19, wherein the processor is further configured to:
provide a weighting for a question word node based on the frequency of occurrence of a question word of the question word node in the set of training data and the frequency of occurrence of an answer word of an answer word node in the set of training data; and
provide weightings of edges between nodes configured to weight an edge according to the frequency of a disjoint question word and answer word pair across the set of training data.

21. The system as claimed in claim 19, wherein the processor is configured to create edges only between question word and answer word pairs with the question words and answer words having lexical or semantic relationships.

22. The system as claimed in claim 19, wherein the processor is configured to provide relationship definitions for edges between question word and answer word pairs and providing a different weighting for at least one relationship definition of one edge.

23. The system as claimed in claim 19, wherein the processor is configured to receive user feedback on results of a user query input into a search engine using the candidate words for expansion and a graph updating component for applying the user feedback to the graph.

24. The system as claimed in claim 23, wherein the received user feedback is only from particular trusted authors.

25. A computer program product for query expansion using a graph of question and answer vocabulary, the computer program product comprising a computer readable storage medium having program instructions embodied therewith, the program instructions executable by a processor to cause the processor to:
providing a set of training data in a given domain in the form of training question texts and training answer texts;
identifying disjoint answer words in the training answer text that do not occur in the associated training question text;
generating a graph of question word nodes and answer word nodes generated from the set of training data for the given domain in the form of the training question texts and the training answer texts, wherein edges are provided between a disjoint pair of a question word node for a question word in a training question and an answer word node for a disjoint answer word in an associated training answer; and
receiving a user query input for a search engine;
applying spreading activation through the graph to propagate a signal which activates nodes, in the graph for at least some words in the user query input, that are used as candidate words for expansion of a user query input; and
providing the candidate words to the search engine for expansion of the user query input.

* * * * *